US005588420A

United States Patent [19]
Dickson

[11] Patent Number: 5,588,420
[45] Date of Patent: Dec. 31, 1996

[54] CHARCOAL-BURNING OUTDOOR HEATER

[76] Inventor: Curtis M. Dickson, 1029 Lofty Pine Dr., Columbia, S.C. 29212

[21] Appl. No.: 459,819

[22] Filed: Jun. 2, 1995

[51] Int. Cl.⁶ .................................................. A47J 37/00
[52] U.S. Cl. ........................................................ 126/25 R
[58] Field of Search ............................ 126/4, 9 R, 9 B, 126/9 A, 41 R, 190, 193, 77, 63, 69, 59, 25 R, 25 A, 304 R, 305

[56] References Cited

U.S. PATENT DOCUMENTS

| | | | |
|---|---|---|---|
| 716,195 | 12/1902 | Cope | 126/77 |
| 1,114,248 | 10/1914 | Garey | 126/77 |
| 1,213,013 | 1/1917 | Ray | 126/4 |
| 2,511,515 | 6/1950 | Schmitt | 126/59 |
| 2,666,426 | 1/1954 | Pollard | 126/25 R |
| 3,428,004 | 2/1969 | Phillips | 126/9 R |
| 3,489,132 | 1/1970 | West | 126/25 R |
| 3,857,380 | 12/1974 | Hansman | 126/25 A |
| 4,759,276 | 7/1988 | Segroves | 126/25 R |
| 5,261,386 | 11/1993 | Burkhart | 126/25 R |
| 5,299,553 | 4/1994 | Giebel et al. | 126/25 R |
| 5,313,928 | 5/1994 | Rodgers et al. | 126/41 R |

Primary Examiner—James C. Yeung
Attorney, Agent, or Firm—Michael A. Mann, P.A.

[57] ABSTRACT

A portable, charcoal-burning heater for out-of-door use comprises a body with a lid. Inside the body is a charcoal-supporting grill above a pull-out ash drawer and a cooking grill above the charcoal-supporting grill. Both grills rest on ledges that also provide structural support to preserve the shape of the body after prolonged, repeated use. Vents on the ends of the body and in the lid enable air to flow across the coals. Insulated handles for the lid and body, an insulated, recessed drawer and insulated feet prevent injury and damage from heat to the user or the surface on which the heater is placed.

13 Claims, 3 Drawing Sheets

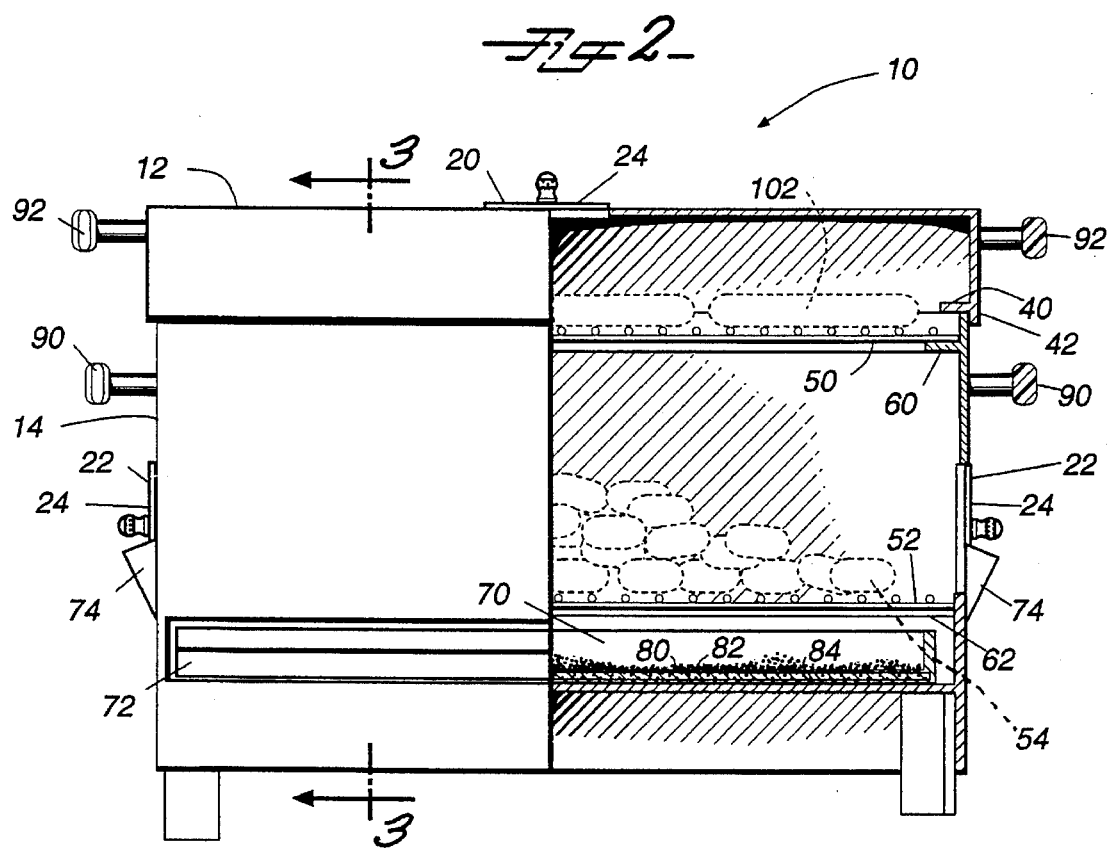

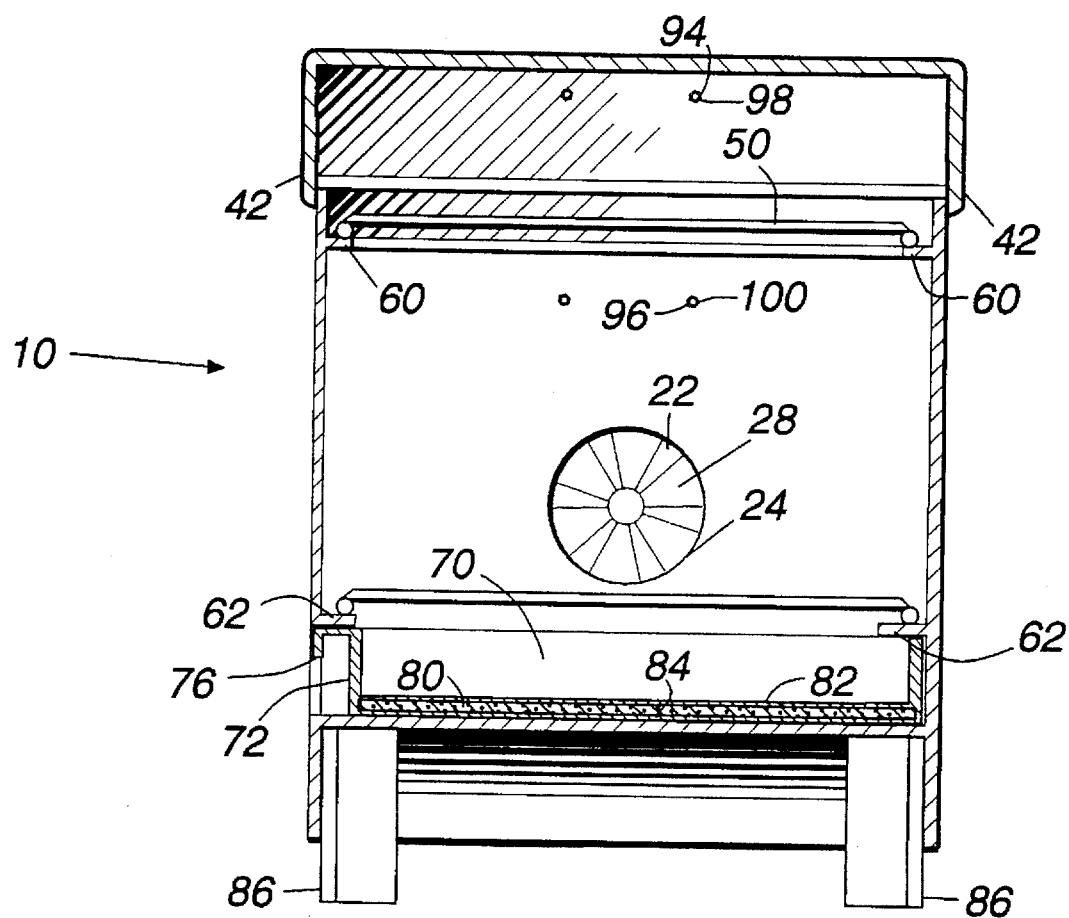

CHARCOAL-BURNING OUTDOOR HEATER

BACKGROUND OF THE INVENTION

1. Field of the Invention

The present invention relates to portable heaters, and, in particular, to portable, charcoal-burning heaters for outdoor use.

2. Discussion of Background

There are many types of outdoor cooking devices that burn charcoal or propane gas as fuel. Typically, charcoal grills have a housing supported by legs and elevated to approximately waist height for the convenience of the user performing the cooking while standing. The housing is dimensioned to hold a charge of charcoal and formed to support a cooking grill positioned above the charcoal. These devices work reasonably well for cooking but cannot serve as a source of heat for someone seated nearby because they are too high.

Outdoor grilling is sufficiently popular in the summer months that many people spend a lot of time on backyard patios. However, on cooler summer evenings in northern latitudes and in early spring or fall evenings in southern latitudes, it is sometimes too cool to be comfortable out-of-doors without a source of heat, even when the weather is otherwise pleasant. A source of heat is also useful on hunting and camping trips.

There are, of course, portable outdoor heaters, including kerosene and electric heaters. These are designed to radiate heat from a position closer to the ground or patio surface for the comfort of those seated nearby. However, they are not generally convenient for both cooking and heating.

There is a need for an outdoor heater that burns charcoal as a fuel and is efficient, safe and convenient to use.

SUMMARY OF THE INVENTION

According to its major aspects and briefly stated, the present invention is a charcoal-burning, portable, outdoor heater. It comprises a rectangular body that can be placed directly on a patio surface. It has four major systems: first there is an insulation system that prevents the bottom of the body from marring or burning the surface of the patio; there is an ash removal system; then there is the charcoal-supporting grill; and finally, a cooking grill. The housing has a lid. Adjustable vents in the sides and the lid enable a draft of air through the interior of the body for combustion.

An important feature of the present invention is the insulation system. This system enables the heater to be placed low, directly on a patio surface, without damage to the surface of the patio and where its heat can be of most benefit to those seated nearby because the heat source is kept low. The insulation system also increases heat radiation efficiency by directing the heat through the sides and top of the heater rather than through the bottom of the heater.

Another important feature of the invention is the ash removal system, which includes a pull-out drawer received into the interior of the body and under the charcoal-supporting grill, and two "cups" to catch ash that falls out of the housing through the side vents. This system makes it easier to control and remove ash from the heater, while protecting the surface from ash deposits.

Still another feature of the present invention is the grill-supporting surface to enable the use of charcoal as a heat source for both heating and cooking. Charcoal has a distinct advantage over propane. One can easily assay the amount of fuel available, before and during use. It is difficult to assay as accurately the amount of propane left in a tank in terms of cooking time. Also, charcoal does not need to be kept under pressure, as propane does.

The housing itself includes a number of important features. For example, the housing includes two sets of handles for moving the heater even when it is operating, one set on the lid and one set on the body. The handles have low thermal conductivity, making them comfortable even at temperatures above 300° F. The ledges inside the housing for supporting the charcoal-supporting grill and the cooking grill double as structural support for the sides of the heater so that, after repeated use, it does not lose its original shape.

These and other features and advantages will be apparent to those skilled in the art from a careful reading of the Detailed Description of Preferred Embodiments accompanied by the following drawings.

BRIEF DESCRIPTION OF THE DRAWINGS

In the drawings,

FIG. 2 is a side view of a heater according to a preferred embodiment of the present invention, partially cut away to show the various components inside; and FIG. 3 is an end cross sectional view of the heater of FIG. 2 taken along lines 3—3.

DETAILED DESCRIPTION OF PREFERRED EMBODIMENTS

Figure 1:
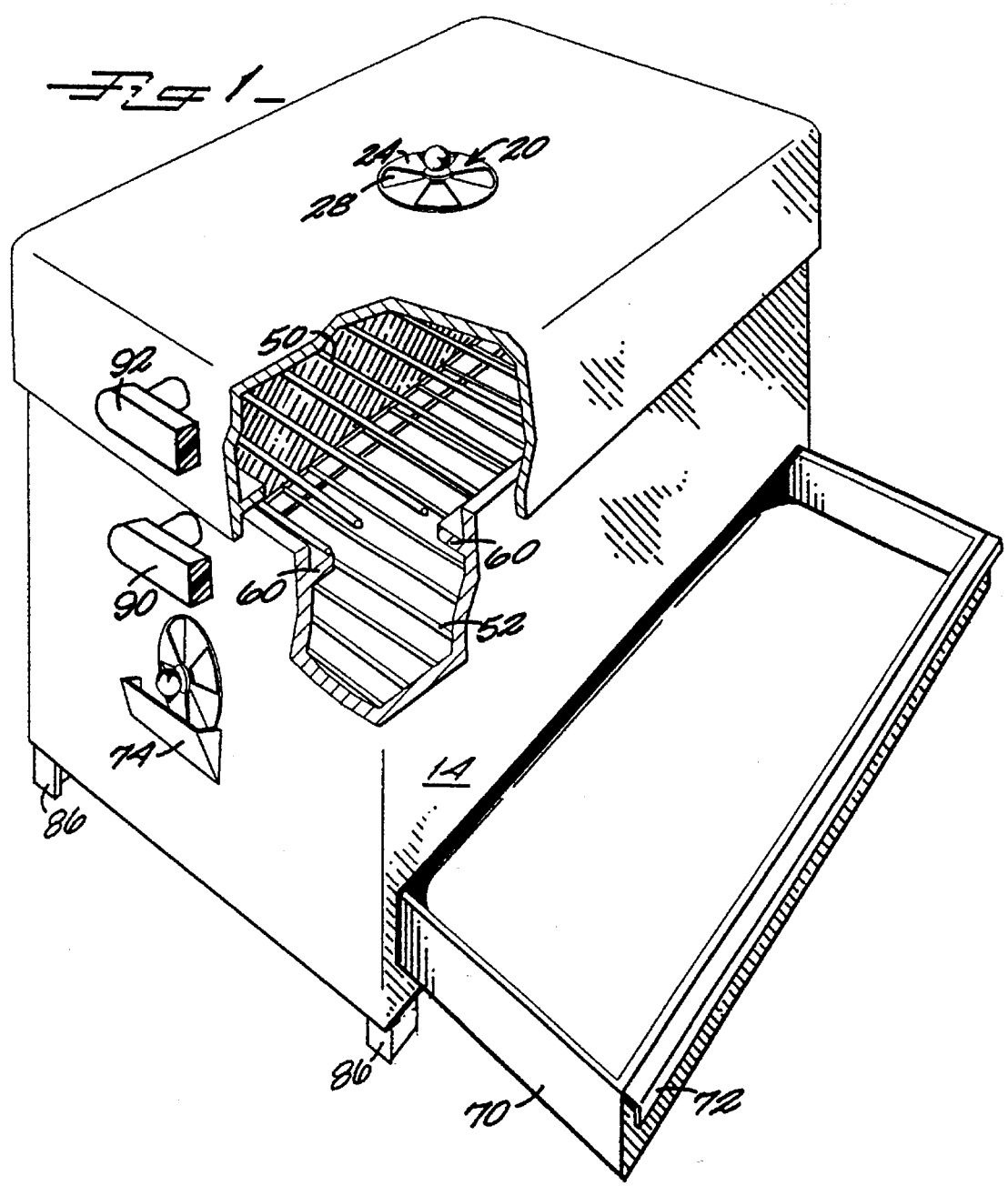
FIG. 1 is an external, partially cut away view of a heater according to a preferred embodiment of the present invention.

The present invention is a portable, charcoal-burning heater for out-of-door use. It requires only a charge of charcoal briquettes to operate; there is no propane or kerosene tank, hoses, fittings, chimney, or electrical cords. It is intended for use in well-ventilated areas such as on an outdoor patio. It is primarily a heat source for comfort of the user in cooler weather, but it can also be used for cooking. Its dual use and portability makes it ideal for camping.

Referring now to the drawings, there is illustrated in the figures an embodiment of the present invention, namely, a rectangular heater 10 having a lid 12 and a body 14. Lid 12 has a vent 20 and body 14 has a vent 22 on each end. Vents 20 and 22 are adjustable, which means that the amount of air that can flow through them can be regulated from low flow to full flow. Vents 20 and 22 operate by rotating perforated disks 24 that cover holes 28, formed in lid 12 and body 14 so that the perforations in disks 24 come into registration with each other, thus permitting air to flow through vents 22 into the interior of body 14 and out of vent 20 of lid 12.

Flanges 40 formed on the inside of lid 12 rest on the top edge of body 14 so that an overhang 42 over body 14 prevents rain from entering body 14 when lid 12 is in place. Inside body 14 is a cooking grill 50 and, below and spaced apart from it, a charcoal-supporting grill 52 that supports a charge of charcoal 54, indicated in phantom because charcoal 54 is not a part of the present invention. Cooking grill 50 rests on a ledge 60 that runs completely around the periphery of the interior of body 14. Ledge 60 has two functions: first, it supports cooking grill 50; second, it provides structural stiffness to the sides and ends of body 14 so that, after repeated use, body 14 maintains its shape.

A second ledge 62, spaced apart from ledge 60, runs from end to end on both sides of body 14 to support charcoal-supporting grill 52. Ledge 62 does not run from side to side in order to allow space to insert and remove grill 52, if desired. Ledge 62 also provides structural support for body 14, especially to the sides of body 14.

Below ledge 62 is a drawer 70 for catching ashes falling from grill 52. Drawer 70 can be removed through an opening 76 formed in and along one side of body 14 for disposing of ashes by pulling a recessed handle 72 and drawing drawer 70 through opening 76 until it is clear of body 14. Outside of body 14, on the ends, are cups 74 just below side vents 22 to catch ashes falling through holes 28 and perforations of disks 24.

Heater 10 has an insulation system which includes insulation 80 carried by drawer 70 (or alternatively between the inner floor 82 and the outer floor 84). Insulation 80, in the form a panel made of a material having a low thermal conductivity that is sandwiched between two layers of sheet steel, prevents heat from being transmitted to the floor. Also, feet 86 at each corner support heater 10 and prevent heat transmitted through the sides and ends of body 14 from reaching the surface on which heater 10 is placed. Feet 86 are made of a material that has a low thermal conductivity so that they do not transfer heat to the floor. Such materials include plastics and ceramics, preferably phenolic thermoset plastics, which are heat resistant to 400° F. Insulation 80 includes any material that is not flammable, has a low thermal conductivity, such as ceramics, some plastics, and fiberglass insulation. These materials are well known to those familiar with materials used for thermal insulation. Such materials have "R" ratings that indicate their ability to retard heat transfer and remain stable (maintain geometry and chemical makeup) when exposed to temperatures of 300° F. or more. Preferably, feet 86 are stable at temperatures in excess of 400° F.

Handles 90, 92 on both ends of body 14 and on both ends of lid 12, respectively, are made of the same material as feet 86, phenolic thermoset plastics, and are attached using bolts 94, 96, fastened using nuts 98, 100, and running through handles 90, 92, into body 14 and lid 12, respectively. Handles should be shaped and made of materials so that body 14 or lid 12 can be lifted by handles 90, 92, respectively, when charcoal 54 is burning without undue discomfort to the lifter.

In use, a charge of charcoal 54 is placed on charcoal-supporting grill 52 so that it is heaped higher toward the middle of heater 10 than toward the ends so as not to block vents 22. Vents 20, 22 are opened by rotating disks 24 until their perforations are in registration so that air can flow through holes 28. Charcoal 54 is lighted, cooking grill 50 is positioned on ledge 60, and lid 12 is placed on body 14 using handles 92. If the user desires to cook or warm a food item 102 or a cup of coffee (not shown), lid 12 is removed using handles 92, and food item 102 or coffee cup is placed on cooking grill 50.

If the user wishes to move heater 10 while it is operating, lid 12 is replaced onto body 14 and handles 90 on body 14 are used to lift heater 10.

When cooled, if user wants to remove ashes, drawer 70 is pulled from body 14 through opening 76 using recessed handle 72 and the ashes disposed of. Drawer 70 is then reinserted into body 14. The recessing of handle 72 has two functions. First, it enables the user to grasp drawer 70; second it inherently recesses the fire in heater 10 to keep it away from opening 76 for safety.

Heater 10, in this embodiment is a compact, efficient heating and cooking article of manufacture, simply but sturdily made of heavy gage sheet steel, preferably 20 gauge cold rolled steel. Ledges 60 and 62 add strength without significant additional weight. Lid 12 protects the inside of body 14 with its overhang 42. A 12 inch wide by 20 inch long by 18 inch high heater according to the present invention will heat for up to six hours on ten pounds of charcoal. If the air temperature is 45° F., the present device will heat the air to a comfortable 72° F. two feet away.

It will be apparent to those skilled in the art of portable heaters that many modifications and substitutions can be made to the foregoing description of preferred embodiments without departing from the spirit and scope of the present invention, which is defined by the appended claims.

What is claimed is:

1. A heater, comprising:
   a rectangular body having an interior, said body including
      first ledges formed on said interior of said body, said first ledges running the periphery of said body,
      second ledges formed on said interior of said body,
      first venting means for venting said interior of said body, said first venting means positioned between said first ledges and said second ledges of said body, and
      a bottom;
   a lid dimensioned to fit over said body, said lid having second venting means for venting said interior of said body when said lid is on said body; and
   a charcoal-supporting grill inside said body resting on said second ledges.

2. The heater as recited in claim 1, wherein said body further comprises a drawer positioned below said charcoal-supporting grill and above said bottom.

3. The heater as recited in claim 1, wherein said bottom is recessed.

4. The heater as recited in claim 1, further comprising a drawer positioned below said charcoal-supporting grill.

5. The heater as recited in claim 1, wherein said first and second venting means are adjustable to control air flow.

6. The heater as recited in claim 1, further comprising handles on said body, said handles made of a material selected from the group consisting of ceramics and plastics.

7. The heater as recited in claim 1, further comprising means carried by said body for catching ash passing through said venting means.

8. The heater as recited in claim 1, wherein said bottom further comprises feet attached to said body made of a material selected from the group consisting of ceramics and plastics.

9. A heater, comprising:
   a body having an interior and having holes formed in said body, said body including
      first venting means for venting said interior of said body and positioned in registration with said holes,
      lower ledges formed on said interior of said body and positioned below said holes,
      an upper ledge carried on said interior of said body and spaced apart from said lower ledges, said upper ledge positioned above said holes, and
      a recessed bottom;
   a lid dimensioned to fit over said body and having a hole formed therein, said lid having
      second venting means positioned in registration with said hole in said lid for venting said interior of said body when said lid is on said body;

a charcoal-supporting grill inside said body and resting on said lower ledges;

a cooking grill inside said body and resting on said upper ledge; and a drawer carried by said body positioned below said charcoal-supporting grill.

10. The heater as recited in claim 9, wherein said upper ledge runs about the periphery of said body.

11. The heater as recited in claim 9, wherein said drawer further comprises a panel of insulation between two layers of metal.

12. The heater as recited in claim 9, further comprising a plurality of feet for supporting said body.

13. The heater as recited in claim 9, further comprising a pair of handles made of a material selected from the group consisting of ceramics and plastics.

* * * * *